(12) United States Patent
Gingerich

(10) Patent No.: US 6,569,357 B2
(45) Date of Patent: May 27, 2003

(54) METHOD OF MAKING ELECTROLUMINESCENT PHOSPHOR

(75) Inventor: Richard G. W. Gingerich, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 92 days.

(21) Appl. No.: 09/965,161

(22) Filed: Sep. 27, 2001

(65) Prior Publication Data

US 2002/0113225 A1 Aug. 22, 2002

Related U.S. Application Data

(60) Provisional application No. 60/256,203, filed on Dec. 18, 2000.

(51) Int. Cl.$^7$ .................................................. H01J 1/62
(52) U.S. Cl. ................................................... 252/301.65
(58) Field of Search ..................................... 252/301.65

(56) References Cited

U.S. PATENT DOCUMENTS 6,064,150 A * 5/2000 Klinedinst et al. .......... 313/503

* cited by examiner

Primary Examiner—C. Melissa Koslow
(74) Attorney, Agent, or Firm—Robert F. Clark

(57) ABSTRACT

A method for improving the half-life of a zinc sulfide-base electroluminescent phosphor, utilizes the steps of; charging phosphor particles into a reaction vessel; fluidizing the particles with an inert gas; heating the reaction vessel and its contents to 200° C.; introducing hexakis(dimethylamido) dialuminum into the reaction vessel; and reacting the hexakis(dimethylamido)dialuminum with the phosphor particles for 10 minutes.

3 Claims, No Drawings

METHOD OF MAKING ELECTROLUMINESCENT PHOSPHOR

This application claims priority from Provisional Patent Application No. 60/256,203, filed Dec. 18, 2000.

TECHNICAL FIELD

This invention relates to zinc sulfide-based electroluminescent phosphors and more particularly to a method for improving the life of such phosphors.

BACKGROUND ART

Phosphors are a known class of materials that emit electromagnetic radiation, usually in the visible region of the spectrum, upon excitation by another form of energy. Phosphors are usually named for the type of energy to which they susceptible. For example, cathodoluminescent phosphors are excited to emission by impingement of electrons or cathode rays; photoluminescent phosphors are excited to emission by impingement of actinic radiation; x-ray phosphors by the impingement of x-rays; and electroluminescent phosphors by the action of an electric field, usually supplied by an alternating current. It is with the latter type of phosphor that this invention is most particularly concerned.

Commercial electroluminescent phosphors are mostly based upon a host material of zinc sulfide activated by one or more activators among which are copper and/or manganese and/or chloride, which are incorporated into the host structure. These phosphors have uses as lamps or illuminating sources for readout devices or watch faces. Two basic kinds are employed, one in which the phosphor is dispersed in an organic binder and laminated in plastic, and a second variety in which the phosphor is dispersed in a ceramic dielectric and fused to a metal plate.

The plastic variety is the more economical; however, the light output of the phosphor encased in an economical plastic such as Mylar™ degrades rapidly. (The lifetime of an electroluminescent phosphor is described by the "Half-Life". The half-life of a phosphor is that point in time when its light output is reduced by half from some initial light output, usually measured after an initial 24 hours).

It would be an advance in the art if the half-life of such phosphors could be extended.

DISCLOSURE OF INVENTION

It is, therefore, an object of the invention to obviate the disadvantages of the prior art.

It is another object of the invention to increase the half-life of electroluminescent phosphors.

These objects are accomplished, in one aspect of the invention, by a method for improving the half-life of a zinc sulfide-base electroluminescent phosphor, comprising the steps of, charging phosphor particles into a reaction vessel; fluidizing the particles with an inert gas; heating the reaction vessel and its contents to 200° C.; introducing hexakis (dimethylamido)dialuminum into the reaction vessel; and reacting the hexakis(dimethylamido)dialuminum with the phosphor particles for 10 minutes.

BEST MODE FOR CARRYING OUT THE INVENTION

For a better understanding of the present invention, together with other and further objects, advantages and capabilities thereof reference is made to the following disclosure and appended claims.

The treatment of electroluminescent phosphors with hexakis(dimethylamido)dialuminum and nitrogen provided phosphors that showed unexpected improvement in half-life after incorporation into A.C. energized plastic lamps.

The phosphors were prepared as follows:

The reaction vessel was a 15 cm Pyrex tube fitted with a porous glass frit bottom. Such a vessel is typically used in chemical vapor deposition processes. To this reaction vessel was added 25.0 kg of a zinc sulfide-based electroluminescent phosphor, such as a Sylvania type 723, available from Osram Sylvania, Towanda, Pa. Nitrogen was passed through the bottom of the reaction vessel at a rate 10 liters/minute to fluidize the phosphor particles. Simultaneously, the vessel and its contents were heated to 200° C. After the mixture of nitrogen and phosphor particles reached 200° C., hexakis (dimethylamido)dialuminum was transported into the fluid bed by bubbling nitrogen (at a rate of 38.9 liters/minute) through a bubbler that contained molten hexakis (dimethylamido)dialuminum (at a temperature of 130° C.) for 10 minutes. At the end of the 10 minute period 250 grams of the phosphor was removed from the vessel and successively, quenched in air, screened through a −325 mesh stainless steel screen and processed into plastic lamps.

The results are shown in Table I.

TABLE I

| Lot No. | Description | X | Y | Light Output 24 hours/FtL | ½ Life Hours | Efficacy Lm/W |
|---|---|---|---|---|---|---|
| H728x106 | Control | 0.191 | 0.482 | 33.6 | 1007 | — |
| A400x127 (Hexa) | H728x106 + Hexa | 0.199 | 0.504 | 31.1 | 1284 | 2.31 |
| H728x103 | Control | 0.187 | 0.436 | 37.1 | 479 | 2.70 |
| A440x112 (Hexa) | H728x103 + Hexa | 0.194 | 0.462 | 37.2 | 516 | 2.61 |

In the table the light output is measured in foot-lamberts, (FtL) and the efficacy is measured in lumens per watt (Lm/W).

As will be seen from Table I, substantial improvement was made in each of the samples tested, in one instance increasing the half-life from 1007 hours to 1284 hours and another instance increasing the half-life from 479 hours to 516 hours.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A method for improving the half-life of a zinc sulfide-base electroluminescent phosphor, comprising the steps of; charging phosphor particles into a reaction vessel; fluidizing said particles with an inert gas; heating said reaction vessel and its contents to 200° C.; introducing hexakis (dimethylamido)dialuminum into said reaction; and reacting said hexakis(dimethylamido)dialuminum with said phosphor particles for 10 minutes.

2. The method of claim 1 said hexakis(dimethylamido)dialuminum is carried into said reaction vessel by nitrogen.

3. The method of claim 2 wherein said hexakis (dimethylamido)dialuminum is carried from a molten supply thereof.

* * * * *